UNITED STATES PATENT OFFICE.

ANDREW BECK AND ISRAEL BECK, OF PHILIPSBURG, PENNSYLVANIA.

IMPROVEMENT IN MECHANICAL MOVEMENTS.

Specification forming part of Letters Patent No. 166,958, dated August 24, 1875; application filed July 2, 1875.

*To all whom it may concern:*

Be it known that we, ANDREW BECK and ISRAEL BECK, of Philipsburg, in the county of Centre and State of Pennsylvania, have invented certain new and useful Improvements in Mechanical Movements; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of our invention consists in the construction and arrangement of a lever-power for obtaining rotary motion applicable to various kinds of machinery, as will be hereinafter more fully set forth.

In the accompanying drawing, Figure 1 is a front elevation, and Fig. 2 a side elevation, of our lever-power, showing the same applied to a washing-machine.

A A represent suitable posts or standards, in which are two parallel shafts, $a$ $a$, having cog-wheels B B secured to them, which cog-wheels are of the same size, and mesh into each other. On one of the shafts $a$ is further secured a large cog-wheel, C, which gears with a pinion, $b$, on a shaft, $d$, and on this latter shaft is secured the fly-wheel E. In the drawing we have shown this fly-wheel connected by a pitman with a reciprocating plunger of a washing-machine; but it is evident that the rotary motion of the fly-wheel may be imparted in any suitable manner to any desired machinery to be driven. The fly-wheel obtains its rotary motion in the following manner: On the front end of each shaft $a$ is secured a double ratchet-wheel, D, provided on its circumference with two sets of teeth set in opposite directions, and each of these wheels is straddled by a slotted or forked lever, G, the prongs of which are pivoted on the shaft. The two levers G G are connected by a pivoted bar, H, and one of them is extended to form the handle G'. In the slot or fork of each lever G is pivoted a double pawl, I, the pivot extending through the front of the lever, and formed with a crank, $e$, upon its end. The two cranks $e$ $e$ are then connected by a bar, J. On one of the levers G is pivoted a shifting-lever, L, the lower end of which is forked, and straddles one of the cranks $e$, as shown, the upper end of said lever being held by a spring, $m$, in a rack, $n$. By working the handle G' back and forth, the pawls—that is, one end of each—work alternately on their respective portions of the ratchet-wheels, giving a continuous rotary motion to the cog-wheel C, and through it to the fly-wheel E. By turning the lever L on its pivot the pawls are turned over so as to cause their other ends to work in their parts of the ratchet-wheels, and thus reverse the motion. In either case the bar J, by its gravity, holds the pawls down to their work. The shifting-lever L is slotted for the passage of its pivot, so that the lever can be raised, whereby neither end of the pawls will engage in the ratchet-wheels, and thus stop the motion.

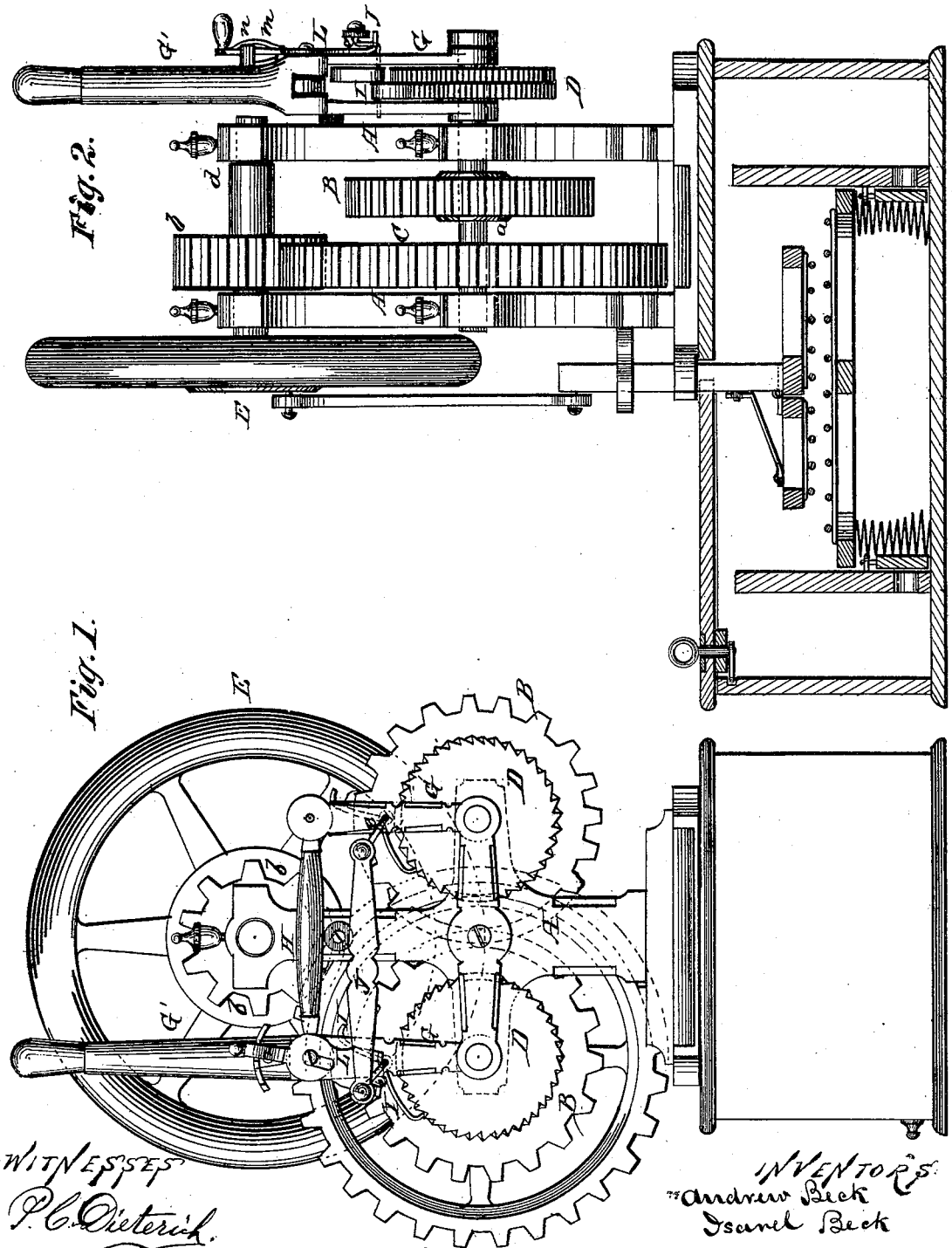

Having thus fully described our invention, what we claim as new, and desire to secure by Letters Patent, is—

1. The combination, with the shafts $a$, $a$, and $d$, gear-wheels B, B, C, and $b$, and fly-wheel E, of the double ratchet-wheels D D, levers G G, connecting-bar H, and double pawls I I, substantially as and for the purposes herein set forth.

2. The combination of the double pawls I I, cranks $e$ $e$, connecting-bar J, and shifting-lever L, all constructed substantially as and for the purposes herein set forth.

In testimony that we claim the foregoing as our own we affix our signatures in presence of two witnesses.

ANDREW BECK.
ISRAEL BECK.

Witnesses:
DANIEL AYRES,
EDWARD A. RYMAN.